Oct. 14, 1924.  1,511,788
J. W. VAUGHAN
MEAT CUTTING BAND SAW
Original Filed May 26, 1919
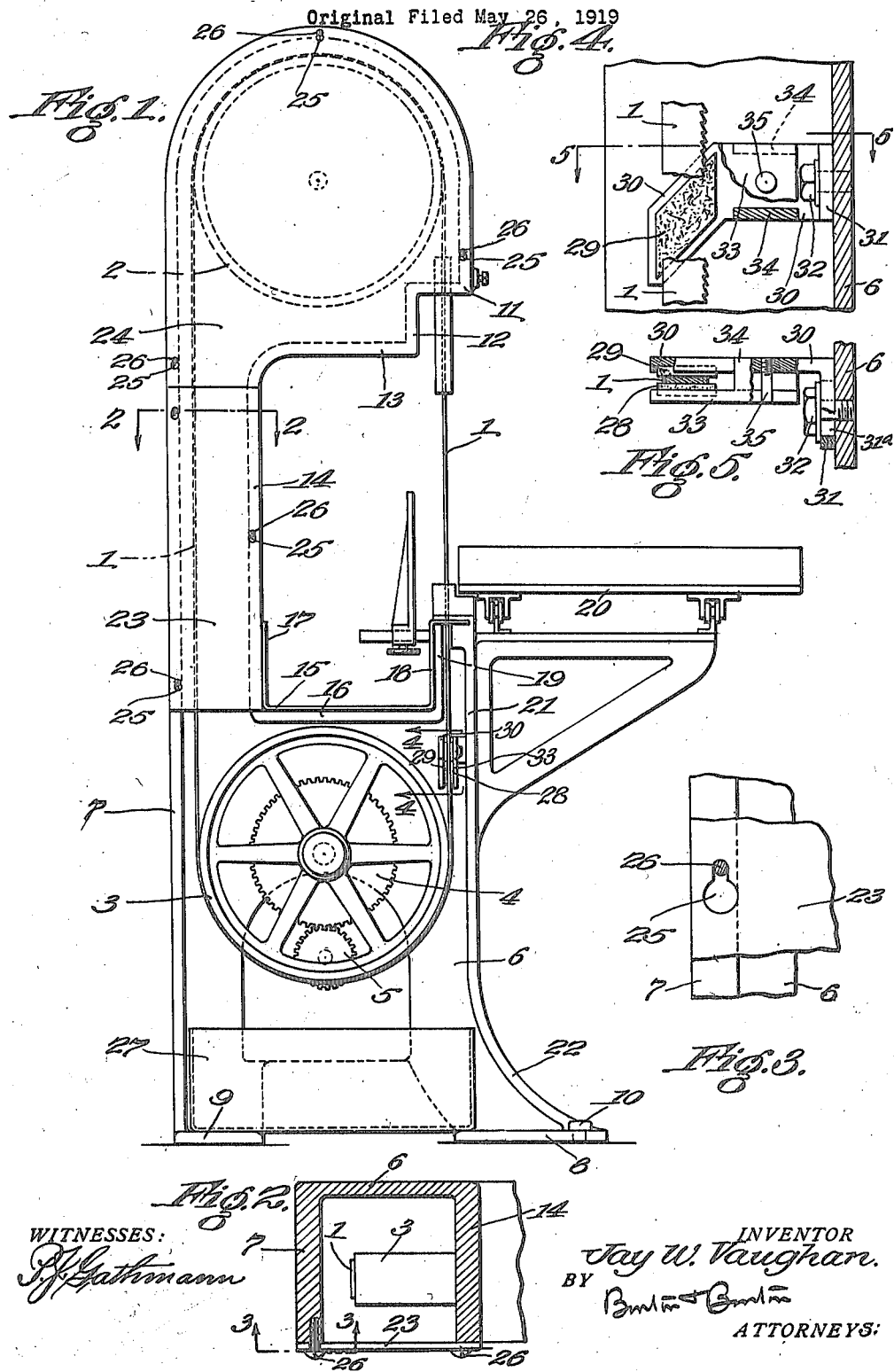
WITNESSES:
INVENTOR
Jay W. Vaughan.
BY
ATTORNEYS:

Patented Oct. 14, 1924.

1,511,788

UNITED STATES PATENT OFFICE.

JAY W. VAUGHAN, OF CHICAGO, ILLINOIS.

MEAT-CUTTING BAND SAW.

Original application filed May 26, 1919, Serial No. 299,718. Divided and this application filed July 12, 1920. Serial No. 395,448.

*To all whom it may concern:*

Be it known that I, JAY W. VAUGHAN, a citizen of the United States, and a resident of the city of Chicago, in the county of Cook and the State of Illinois, have invented certain new and useful Improvements in Meat-Cutting Band Saws, of which the following is a specification, reference being had to the accompanying drawings, forming a part thereof.

This application is a division of my application, Serial No. 299,718, filed May 26, 1919, and it relates to improved construction in band saws and particularly in the construction of the supporting frame which is designed to enclose the saw to prevent any scraps of the material upon which it operates being thrown off from the saw, or its carrying wheel, into the room or onto the work table of the machine. These features of construction are particularly directed to adapting a band saw for cutting and slicing meat and the invention further includes some other features of the machine by which it is especially well adapted for this work. These various features and elements of construction are shown in the drawings and hereinafter described and the points of novelty are indicated by the appended claims.

In the drawings:

Figure 1 is a side elevation of a band saw embodying this invention showing the side of the machine toward which the meat is moved past the saw for the cutting operation and therefore showing the rear edge of the saw blade.

Fig. 2 is a transverse section of the frame taken as indicated at line 2—2 on Figure 1 and showing the position of the saw therein.

Fig. 3 is a detail section taken as indicated at line 3—3 on Figure 2 showing the means of securing the cover plate on the frame.

Fig. 4 is a detail section taken as indicated at line 4—4 on Fig. 1 and showing wiping pads for the saw blade.

Fig. 5 is a detail section taken as indicated at line 5—5 on Figure 4.

In the machine shown in the drawings the saw blade, 1, consists of an endless steel band having its teeth on the edge opposite that which is seen in Figure 1 and this band is mounted upon upper and lower carrying wheels, 2 and 3, respectively. The upper wheel, 2, is an idler wheel supported upon a special adjustable journal more fully described in my pending application, Serial No. 299,718. The lower wheel, 3, has rigid with it a gear, 4, meshing with a pinion, 5, on the shaft of a motor by which the saw is thus driven. The wheels, 2 and 3, are mounted in a frame preferably formed as a casting having a web portion, 6, whose outline is clearly disclosed in Figure 1 and which is formed with a deep peripheral flange, 7. At the bottom of the frame the depth of this flange is somewhat increased to connect with a flared foot flange, 8, and a second foot flange, 9, which may be suitably apertured to receive the lag screws or bolts, 10, for securement of the frame to the floor.

Starting from the foot flange, 9, the peripheral flange, 7, extends upwardly parallel to the vertical portion of the saw blade, 1, and continues parallel thereto around the carrying wheel, 2, down to the point indicated at 11 where said flange, and also the outline of the web, 6, extend horizontally for a short distance and then downwardly again at 12 connecting with a second horizontal portion, 13, which extends under the wheel, 2. It continues downwardly at 14 parallel to the vertical path of the saw blade to the level of the receiving pan, 15, where the flange again extends horizontally just above the wheel, 3, at 16. The pan, 15, is formed with rather deep side flanges, 17 and 18, the former fitted snugly against the flange, 14, of the frame and the latter fitting against the vertical part, 18, of said flange which connects with the horizontal portion, 16, and extends upwardly almost to the level of the movable work table, 20. The saw blade, 1, travels downwardly toward the work table, passing between the flange, 19, and a similar flange, 21, extending from the web, 6, and completing the outline in a sweeping curve, 22, extending to the base, or foot flange, 8.

As seen in Figure 2 the depth of the flange, 7, and of the opposite flange, 14, through which this section is taken is about three times the width of the face of wheel, 3, and more than three times the width of the band saw, 1, thus giving ample clearance for said saw in its travel and at the same time completely housing it. By providing cover plates, 23 and 24, for the upper and middle portions of the frame the saw is entirely enclosed and, if desired, a similar cover plate may be applied opposite the drive wheel, 3, and below the receiving pan, 15. The peripheral flange extending from the web, 6, of the frame is of uniform depth except at the base of the machine so that the edge of said flange which is seen in Figure 1 lies substantially all in the same plane rendering the application of cover plates a very simple matter. To permit ready removal of such plates they may be formed with button-hole openings such as that shown in Figure 3 at 25 engaging clamping screws, 26, set in the edge of the flange at suitable intervals.

For cutting meat it is desirable to run the saw, 1, at fairly high speed and while a smooth cut is usually accomplished there are always some particles of the meat liable to be torn off and carried along with the saw. If such particles adhere to the saw as it travels around the foot wheel, 3, or the head wheel, 2, the centrifugal force there generated will tend to throw the particles off; but directly below the wheel, 3, a removable pan, 27, is provided to catch the material thrown off from the saw and the wheel, 3, and this will be the greater part of such material. Any other particles which are loosened in the upward travel of the saw blade will be confined to the chamber formed by the web, 6, flanges, 7 and 14, and cover plate, 23, of the frame enclosing this part of the saw. Particles loosened as the saw passes over the wheel, 2, are likewise confined within the chamber closed by the cover plate, 24, so that even material which might adhere to the wheel, 2, and then be thrown off at its lower side is arrested by the portion of the peripheral flange at 13 and thus prevented from falling onto the meat in the pan, 15. The particles thus accumulating upon the walls of the frame may be periodically cleaned out on loosening the screws and removing the cover plates, 23 and 24 while, of course, the accumulation in pan 27, may be dumped at any time.

For minimizing the deposit of such particles upon the walls of such frame a wiper for the saw blade is preferably mounted adjacent its path just below the plane of the flange, 16. This wiper consists of a pair of arms carrying wiping pads, 28 and 29, which may consist of felt reinforced with wire or of a harder and more highly compressed grade without such reinforcement held in contact with the opposite faces of the saw blade. One of the arms, 30, is in the form of a bracket having its foot, 31, secured to the web, 6, of the frame by a screw, 32, while the other arm, 33, is formed with guide lugs, 34, overlapping the arm, 30, and is attached thereto by a clamp screw, 35, by which the pressure of the pads, 28 and 29 against the saw blade, 1, may be adjusted. Preferably the outline of the arms, 30 and 33, is such that their upper edges adjacent the saw blade, 1, extend obliquely downward from the supporting extensions of the arms so that the downward travel of the saw blade against the corresponding oblique edges of the pads, 28 and 29, will cause material arrested by these edges of the pads and arms to work off downwardly along the oblique edges instead of lodging and accumulating thereon as it would tend to do if they were perpendicular to the direction of travel of the saw blade. To avoid undue pressure upon one side or the other of the saw blade and to permit adjustment of the arms, 30 and 33, to the position at which the saw will normally run the foot, 31, is slotted in direction transverse to the plane of the saw blade, 1, thus permitting the pad-carrying arms to be moved bodily in this direction upon loosening of the screw, 32, for the purpose of such adjustment.

I claim:—

1. In a meat-cutting band saw comprising two saw-supporting wheels arranged one above the other, and an endless saw blade thereon, a supporting frame for the wheels having upper and lower web portions substantially parallel to the plane of the wheels with marginal flanges whose depth exceeds the width of the wheel rims, and a vertically connecting web of restricted width extending adjacent the upwardly traveling ply of the saw blade, said restricted web having marginal flanges at opposite sides of the saw blade respectively, and exceeding said blade in depth so that the inner one of said flanges extends between the blade and the work table, the upper and lower webs adjacent the wheels having horizontal flange portions which extend respectively below and above said wheels and connect with the inner flange of the restricted web for completely protecting the work table from scraps thrown off by the blade in its travel.

2. In a meat cutting band saw comprising two saw-supporting wheels arranged one above the other and an endless saw blade thereon; a combined frame and guard comprising a vertically extending web portion on which said wheels are supported and marginal flanges extending from said web having a depth which exceeds the width of the wheel rims, this web including a portion of restricted width intermediate the wheels with marginal flanges disposed at opposite sides of the upwardly traveling ply of the saw blade, the inner marginal flange of said restricted portion connecting with horizontal marginal flanges of the web respectively, adjacent the upper side of the lower wheel and the lower side of the upper wheel, together with foot flanges at the lower end of the web and bracket means for supporting a work table adjacent the downwardly traveling ply of the saw blade.

3. A band saw frame comprising a vertically extending channel portion surmounted by an integral housing for the upper band saw wheel, and connected integrally with a base portion of wider channel section to accommodate the lower band saw wheel between its flanges, one flange of said lower section extending in vertical alignment with one flange of the channel, said channel opening laterally with respect to the wheels, and being positioned to accommodate one ply of the band saw, the frame providing an open gap between the upper wheel housing and said lower portion for exposure of the other ply of the saw and foot flanges connecting with the flanges of the widened lower channel section.

In testimony whereof I have hereunto set my hand at Chicago, Illinois, this ninth day of July, 1920.

JAY W. VAUGHAN.